(12) United States Patent
Herman

(10) Patent No.: US 12,446,571 B2
(45) Date of Patent: Oct. 21, 2025

(54) FLIGHT DIVERTER ASSEMBLIES FOR AERIAL CONDUCTORS

(71) Applicant: Hubbell Incorporated, Shelton, CT (US)

(72) Inventor: Kyle Randy Herman, Lake Forrest, CA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/047,433

(22) Filed: Oct. 18, 2022

(65) Prior Publication Data

US 2023/0120182 A1 Apr. 20, 2023

Related U.S. Application Data

(60) Provisional application No. 63/256,776, filed on Oct. 18, 2021, provisional application No. 63/256,770, filed on Oct. 18, 2021.

(51) Int. Cl.
*A01M 29/32* (2011.01)

(52) U.S. Cl.
CPC .................. *A01M 29/32* (2013.01)

(58) Field of Classification Search
CPC ...... A01M 29/00; A01M 29/06; A01M 29/30; A01M 29/32; E04D 13/004; H02G 7/00; H02G 7/08; Y10S 116/33; F16B 2/00; F16B 2/02; F16B 2/06; F16B 2/10; F16B 2/08; F16B 2/18; F16B 2/185

USPC .......... 52/101; 256/11, 12; 174/40 CC, 135, 174/650, 652, 68.1, 5 R; 248/49, 68.1, 248/74.1, 74.2

See application file for complete search history.

(56) References Cited

U.S. PATENT DOCUMENTS

| | | |
|---|---|---|
| 3,835,238 A | 9/1974 | West |
| 6,005,196 A | 12/1999 | Spillyards |
| 6,995,313 B1 * | 2/2006 | Barnett .................... H02G 7/05 |
| | | 174/138 F |
| 9,960,586 B2 * | 5/2018 | Niles ....................... H02G 7/00 |

(Continued)

FOREIGN PATENT DOCUMENTS

| | | | | |
|---|---|---|---|---|
| CN | 112599314 A | * | 4/2021 | ............. H01B 17/58 |
| CN | 112806350 A | * | 5/2021 | |

(Continued)

*Primary Examiner* — Joshua D Huson
*Assistant Examiner* — Brook Victoria Schmid
(74) *Attorney, Agent, or Firm* — Ruggiero McAllister & McMahon LLC

(57) ABSTRACT

A flight diverter assembly is provided that includes a first section, a second section, a biasing member, and a toggle action lever mechanism. The first and second sections are movable with respect to one another about a hinge axis between an open position and a closed position. The biasing member normally biasing the first and second sections to the closed position. The toggle action lever mechanism is connected to the first and second sections and has an over-center position that corresponds with the open position. The toggle action lever mechanism releasably holds the first and second sections in the open position when in the over-center position, but interacts, during installation on a conductor, with the conductor to move the toggle action lever mechanism from the over-center position to move the first and second sections to the closed position.

17 Claims, 17 Drawing Sheets

(56) References Cited

U.S. PATENT DOCUMENTS

| | | |
|---|---|---|
| 2012/0255503 A1 * | 10/2012 | Spencer ................ A01M 29/06 |
| | | 119/713 |
| 2013/0104798 A1 | 5/2013 | Spencer |
| 2014/0262434 A1 | 9/2014 | Stransky et al. |
| 2015/0229113 A1 | 8/2015 | Dobrinski et al. |
| 2015/0303671 A1 | 10/2015 | Royer et al. |
| 2016/0111863 A1 | 4/2016 | Williams et al. |
| 2018/0316171 A1 | 11/2018 | Niles et al. |
| 2020/0303911 A1 | 9/2020 | McGowan et al. |
| 2021/0268640 A1 | 9/2021 | Clarke et al. |

FOREIGN PATENT DOCUMENTS

| | | | | |
|---|---|---|---|---|
| CN | 113197195 A | * | 8/2021 | ............ A01M 29/30 |
| CN | 113725793 A | * | 11/2021 | |
| CN | 214629436 U | | 11/2021 | |
| CN | 113964719 A | | 1/2022 | |
| DE | 29804595 U1 | | 7/1998 | |
| EP | 3001205 A1 | * | 3/2016 | ............. G01R 15/18 |
| EP | 3540887 A1 | | 9/2019 | |
| GB | 2589161 A | * | 5/2021 | ............ A01M 29/30 |
| JP | 201597445 A | | 5/2015 | |
| KR | 20140002686 U | | 5/2014 | |
| KR | 20150042111 A | * | 4/2015 | |
| KR | 20200000068 U | * | 1/2020 | |
| WO | WO-2010128929 A1 | * | 11/2010 | ................ F16B 2/10 |

\* cited by examiner

FLIGHT DIVERTER ASSEMBLIES FOR AERIAL CONDUCTORS

CROSS REFERENCE TO RELATED APPLICATIONS

This application claims the benefit of U.S. Application 63/256,776 filed Oct. 18, 2021 and claims the benefit of U.S. Application 63/256,770 filed Oct. 18, 2021, the entire contents of both of which are incorporated by reference herein.

BACKGROUND

1. Field of the Invention

The present disclosure relates to flight diverter assemblies for aerial conductors. More specifically, the present disclosure relates to flight diverter assemblies that can be placed on electrical conductors using a lineman hotstick and/or while the conductors are energized.

2. Description of Related Art

It is commonplace to suspend utility conductors or lines above the ground. These conductors or lines are generally referred to as aerial conductors or aerial lines and can include communication conductors, electrical conductors, and others.

It is known that flying animals, such as but not limited to birds, bats, insects, even airplanes or drones, and others, can collide with or fail to avoid the aerial conductors that hang across their path during flight. The collision can injure the animal and/or damage the conductor.

In addition, it is also known that some flying animals may perch or nest on aerial conductors. The perching or nesting on aerial conductors, particularly on aerial electrical conductors, can electrocute the animal and/or damage the conductor and/or create a fire hazard to the surrounding environment.

Thus, it has been known to install flight diverters onto the aerial lines. However, it has been found that many prior art diverters can be expensive to make, can be difficult to install, can require the lines to be de-energized during installation, can fail to remain in the desired location on the aerial line, and others identified issues.

Accordingly, there is a need for flight diverter assemblies that address overcome, alleviate, and/or mitigate one or more of the aforementioned and other deleterious effects of the prior art.

SUMMARY

A flight diverter assembly is provided that includes a first section, a second section, a biasing member, and a toggle action lever mechanism. The first and second sections are movable with respect to one another about a hinge axis between an open position and a closed position. The biasing member normally biasing the first and second sections to the closed position. The toggle action lever mechanism is connected to the first and second sections and has an over-center position that corresponds with the open position. The toggle action lever mechanism releasably holds the first and second sections in the open position when in the over-center position, but interacts, during installation on a conductor, with the conductor to move the toggle action lever mechanism from the over-center position to move the first and second sections to the closed position.

In some embodiments either alone or together with any one or more of the aforementioned and/or after-mentioned embodiments, the first and second sections have an identical shape or a different shape.

In some embodiments either alone or together with any one or more of the aforementioned and/or after-mentioned embodiments, the first and/or second sections have a feature selected from a group consisting of a planar outer surface, a non-planar outer surface, a convex outer surface, and combinations thereof.

In some embodiments either alone or together with any one or more of the aforementioned and/or after-mentioned embodiments, the first and second sections have a feature selected from a group consisting of a reflection material, an emittance material, and combinations thereof.

In some embodiments either alone or together with any one or more of the aforementioned and/or after-mentioned embodiments, the biasing member is a torsion spring positioned about the hinge axis.

In some embodiments either alone or together with any one or more of the aforementioned and/or after-mentioned embodiments, the first and/or second sections further include a hotstick engaging region that is positioned above the hinge axis.

In some embodiments either alone or together with any one or more of the aforementioned and/or after-mentioned embodiments, the first and/or second outer sections further include a hotstick engaging region positioned at a lower edge.

In some embodiments either alone or together with any one or more of the aforementioned and/or after-mentioned embodiments, the first section has a first conductor capturing region and the second section has a second conductor capturing region. The first and second conductor capturing region define, when in the closed position, a conductor receiving area therebetween.

In some embodiments either alone or together with any one or more of the aforementioned and/or after-mentioned embodiments, the assembly further includes a first gripping pad disposed in the first conductor capturing region and second gripping pad disposed in the second conductor capturing region.

In some embodiments either alone or together with any one or more of the aforementioned and/or after-mentioned embodiments, the first and second gripping pads each further include connecting prongs receives in openings within the first and second conductor capturing regions, respectively.

In some embodiments either alone or together with any one or more of the aforementioned and/or after-mentioned embodiments, the first and second conductor capturing regions further include a surface that leads or guides the conductor towards the conductor receiving area.

A method of installing a flight diverter assembly on a conductor. The method includes moving the flight diverter to an open position such that a toggle action lever mechanism connected to the first and second sections is in an over-center position that releasably holds the first and second sections in the open position; engaging a lineman hotstick to a first section and/or a second section of the flight diverter assembly; using the lineman hotstick to move the flight diverter assembly in an installation direction with respect to the aerial conductor so that the conductor interacts moves the toggle action lever mechanism from the over-center position such that the biasing member and the toggle action lever mechanism the first and second sections to a closed position around the conductor; and disengaging the lineman hotstick from the flight diverter assembly.

In some embodiments either alone or together with any one or more of the aforementioned and/or after-mentioned embodiments, the electrical conductor is energized during installation of the assembly.

A flight diverter assembly is provided that includes a first section, a second section, and a biasing member. The first section has a first outer surface, a first hinge pin, a first hinge knuckle, and a first extension arm. The first extension arm connects the first outer surface to the first hinge pin and the first hinge knuckle. The second section has a second outer surface, a second hinge pin, a second hinge knuckle, and a second extension arm. The second extension arm connects the second outer surface to the second hinge pin and the second hinge knuckle. The first hinge pin is movably secured to the second hinge knuckle and the second hinge pin is movably secured to the first hinge knuckle so that the first and second sections are movable about a hinge axis defined through the first and second hinge pins. The biasing member normally biases the first and second sections to a normally closed position about the hinge axis.

In some embodiments either alone or together with any one or more of the aforementioned and/or after-mentioned embodiments, the first section and the second section have an identical shape.

In some embodiments either alone or together with any one or more of the aforementioned and/or after-mentioned embodiments, the biasing member is a torsion spring positioned about the hinge axis.

In some embodiments either alone or together with any one or more of the aforementioned and/or after-mentioned embodiments, the first and second outer surfaces include reflection materials, emittance materials, and combinations thereof.

In some embodiments either alone or together with any one or more of the aforementioned and/or after-mentioned embodiments, the first extension arm includes two first extension arms and the second extension arm includes two second extension arms.

In some embodiments either alone or together with any one or more of the aforementioned and/or after-mentioned embodiments, the first hinge pin depends from one of the two first extension arms and the first hinge knuckle depends from another of the two first extension arms, while the second hinge pin depends from one of the two second extension arms and the second hinge knuckle depends from another of the two second extension arms.

In some embodiments either alone or together with any one or more of the aforementioned and/or after-mentioned embodiments, the first section and/or the second section each further includes a hotstick engaging region, which is positioned between, along the hinge axis, the first and second hinge pins.

In some embodiments either alone or together with any one or more of the aforementioned and/or after-mentioned embodiments, the first section and/or the second section further include a hotstick engaging region.

In some embodiments either alone or together with any one or more of the aforementioned and/or after-mentioned embodiments, the first outer surface and/or the second outer surface are non-planar or convex.

In some embodiments either alone or together with any one or more of the aforementioned and/or after-mentioned embodiments, the first extension arm and the second extension arm cross one another when in the normally closed position.

In some embodiments either alone or together with any one or more of the aforementioned and/or after-mentioned embodiments, the first extension arm and the second extension arm do not cross one another when in an open position.

In some embodiments either alone or together with any one or more of the aforementioned and/or after-mentioned embodiments, the first extension arm has a first conductor capturing region that is semi-circular and the second extension arm has a second conductor capturing region that is semi-circular.

In some embodiments either alone or together with any one or more of the aforementioned and/or after-mentioned embodiments, further including a first gripping pad disposed in the first conductor capturing region and second gripping pad disposed in the second conductor capturing region.

A flight diverter assembly is also provided that includes two identically shaped sections and two torsion springs. The identically shaped sections have an outer surface connected by a first extension arm to a hotstick engaging region and by a second extension arm to a hinge knuckle, the hotstick engaging region having a hinge pin depending therefrom opposite the first extension arm, the two identically shaped sections being secured for movement about a hinge axis by connection of the hinge pins and hinge knuckles, respectively. The two torsion springs are positioned around the hinge pin between the hotstick engaging region and the hinge knuckle, respectively, so as to normally bias the two identically shaped sections to a normally closed position about the hinge axis. The outer surface includes reflection materials, emittance materials, and combinations thereof.

In some embodiments either alone or together with any one or more of the aforementioned and/or after-mentioned embodiments, the first and second extension arms each have conductor capturing regions that are semi-circular and are positioned between the hinge axis and the outer surface.

In some embodiments either alone or together with any one or more of the aforementioned and/or after-mentioned embodiments, further including two gripping pads disposed in the conductor capturing region, respectively.

In some embodiments either alone or together with any one or more of the aforementioned and/or after-mentioned embodiments, the outer surfaces are non-planar or convex.

A method of installing a flight diverter assembly on an aerial conductor is provided. The method includes engaging a lineman hotstick to one of two identically shaped sections of the flight diverter assembly; using the lineman hotstick to move the flight diverter assembly in an installation direction with respect to the aerial conductor so that the aerial conductor contacts an inner surfaces of each of the two identically shaped sections to rotate the two identically shaped sections with respect to one another about a hinge axis by overcoming a biasing force; allowing the biasing force to move the two identically shaped sections towards a closed position capture the aerial conductor between conductor capturing regions of the two identically shaped sections; and disengaging the lineman hotstick from the flight diverter assembly.

In some embodiments either alone or together with any one or more of the aforementioned and/or after-mentioned embodiments, the electrical conductor is energized.

The above-described and other features and advantages will be appreciated and understood by those skilled in the art from the following detailed description, drawings, and appended claims.

DETAILED DESCRIPTION

Figure 1:
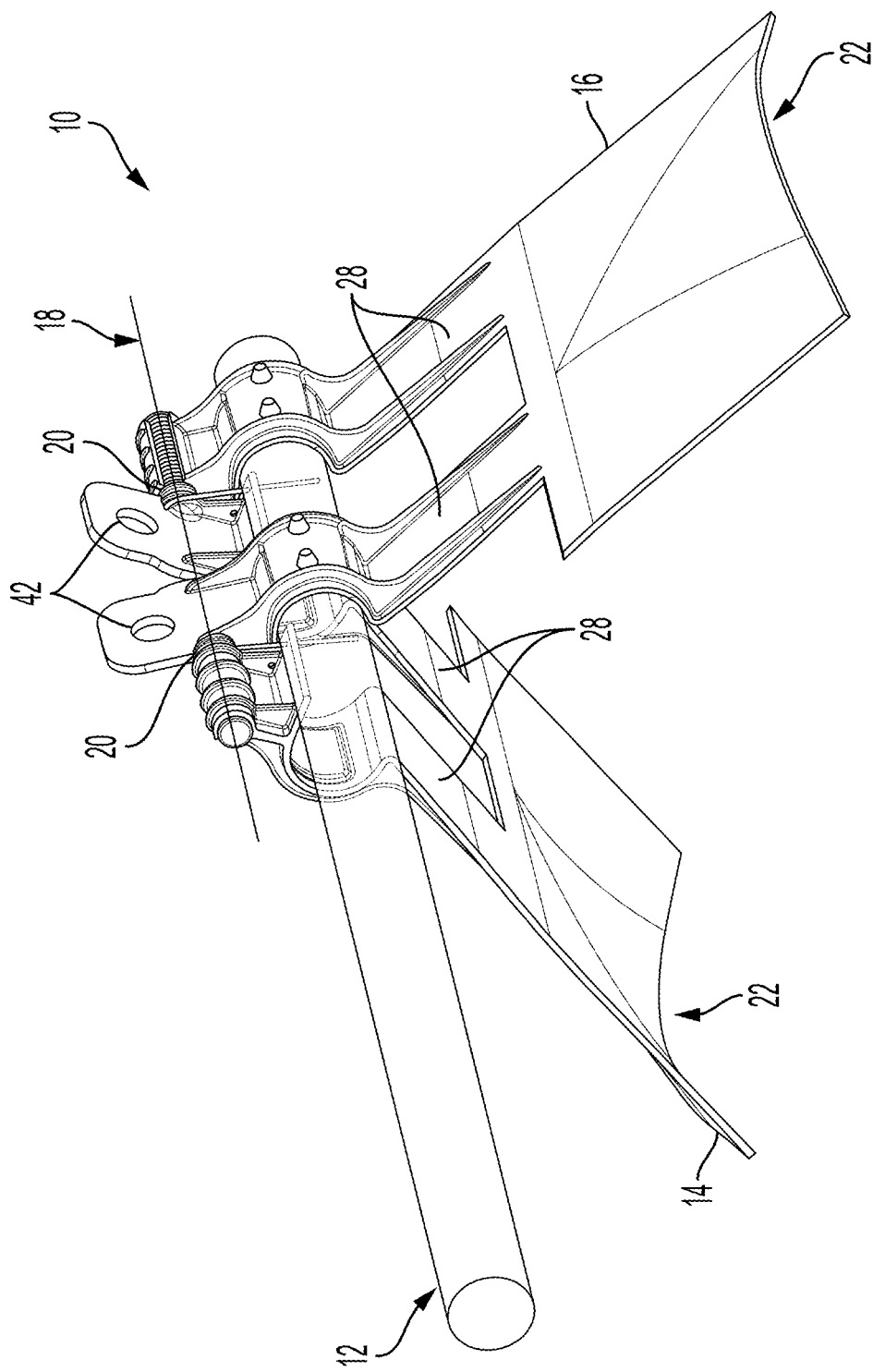
FIG. 1 is a perspective view of an exemplary embodiment of a flight diverter assembly according to the present disclosure shown installed on an aerial conductor.
Figure 2:
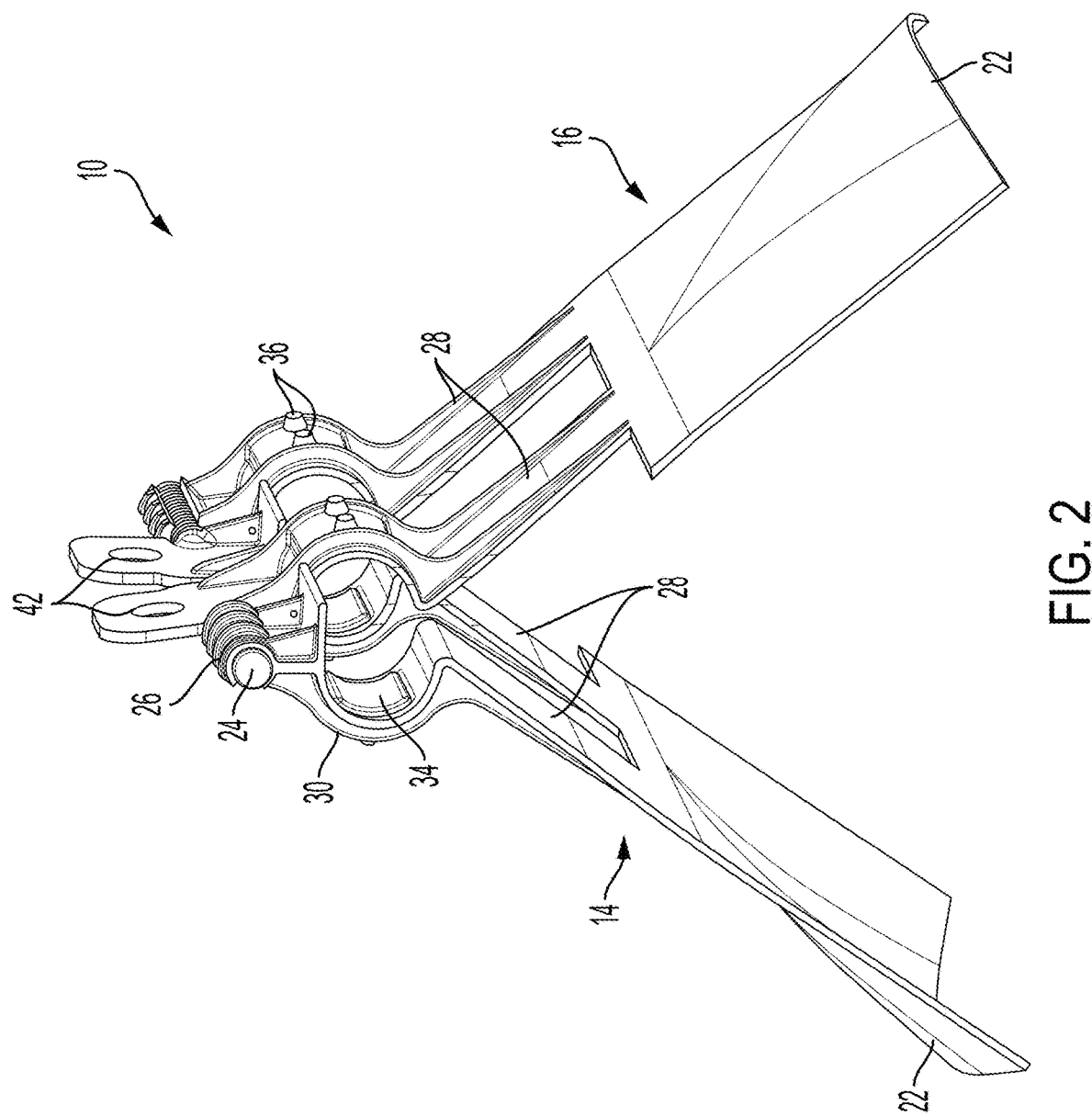
FIG. 2 is a perspective view of the flight diverter assembly of FIG. 1 having the aerial conductor omitted for purposes of clarity.

Referring to the drawings and in particular to FIG. 1, an exemplary embodiment of a flight diverter assembly according to the present disclosure is shown and is generally referred to by reference numeral 10.

Advantageously, assembly 10 has a simple design that is easy to make, assemble, and install. Moreover, assembly 10 is configured for installation onto a conductor 12 using a lineman hotstick (not shown), which allows installation while the conductor is energized.

Assembly 10 is described in more detail with simultaneous reference to FIGS. 1-8.

Figure 3:
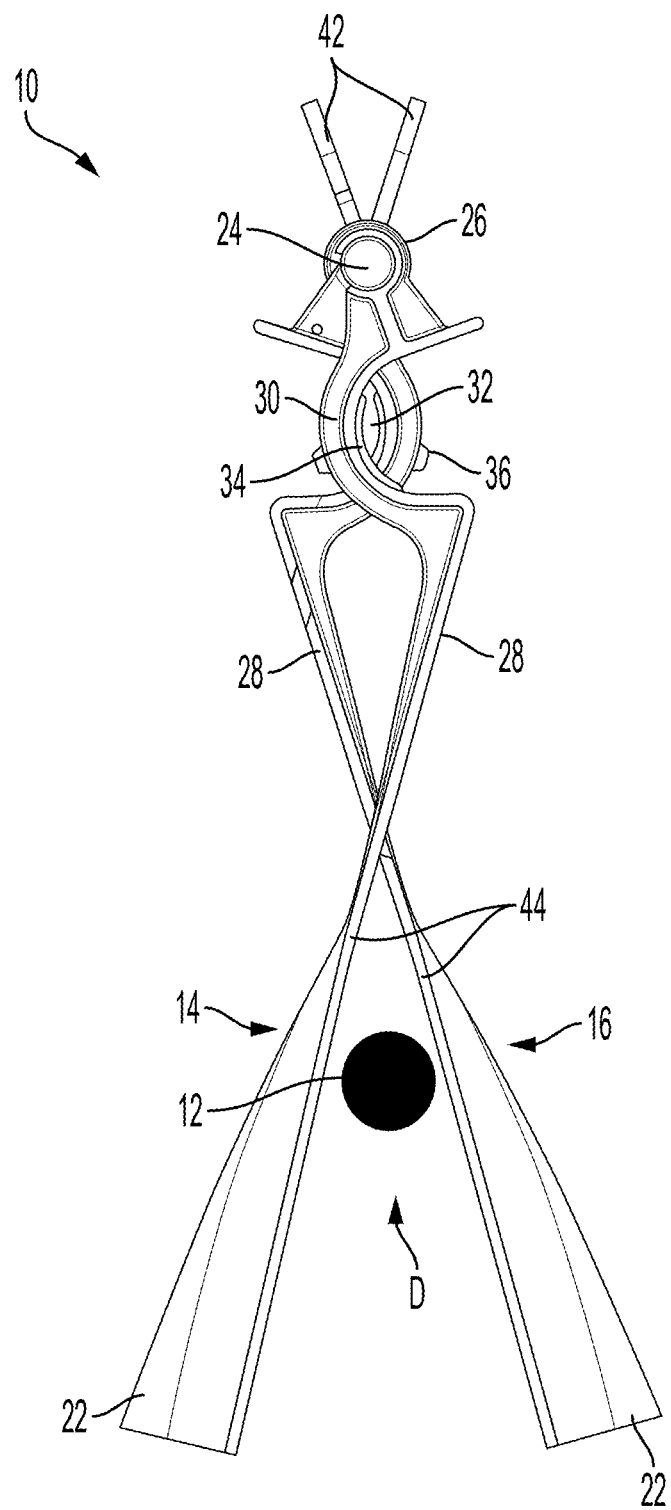
FIG. 3 is a side view of the flight diverter assembly of FIG. 1 in a normally closed position and before installation of the aerial conductor.

Generally, assembly 10 includes a first section 14 and a second section 16 that are connected along a hinge axis 18 and biased via one or more biasing member 20 to a closed position (FIG. 3). Assembly 10 is configured so that sections 14, 16 splay open about hinge axis 18 to an open position (FIG. 6) when a force sufficient to overcome biasing member 20 is applied. In this manner, assembly 10 can be pushed over conductor 12 so as attach the assembly onto the conductor as will be described in more detail below.

Figure 7:
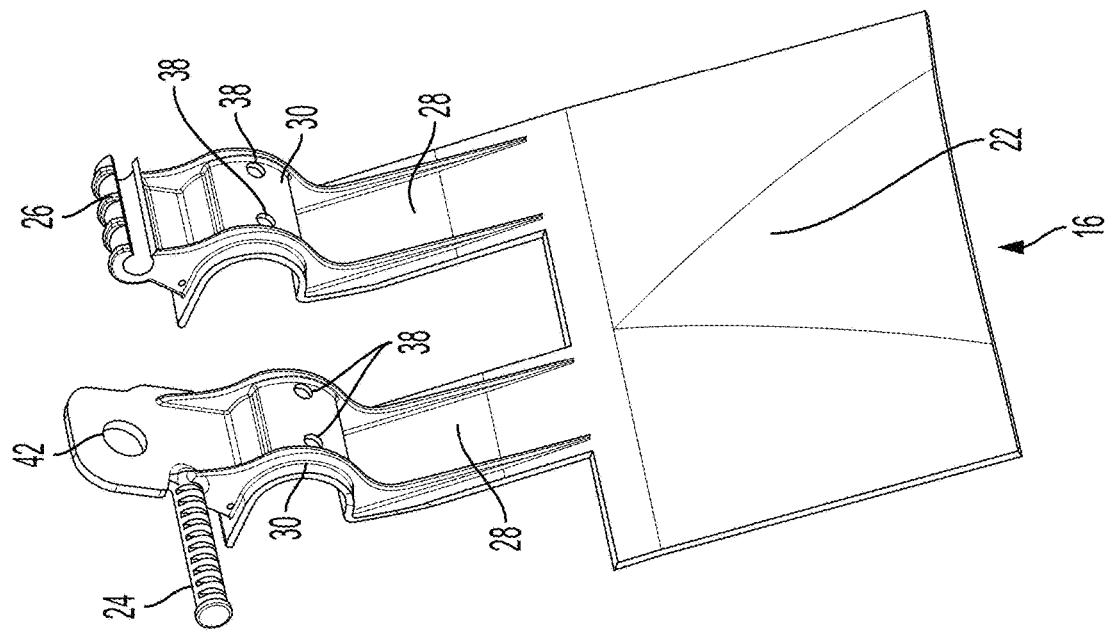
FIG. 7 is an exploded perspective view of the flight diverter assembly of FIG. 1.
Figure 7:
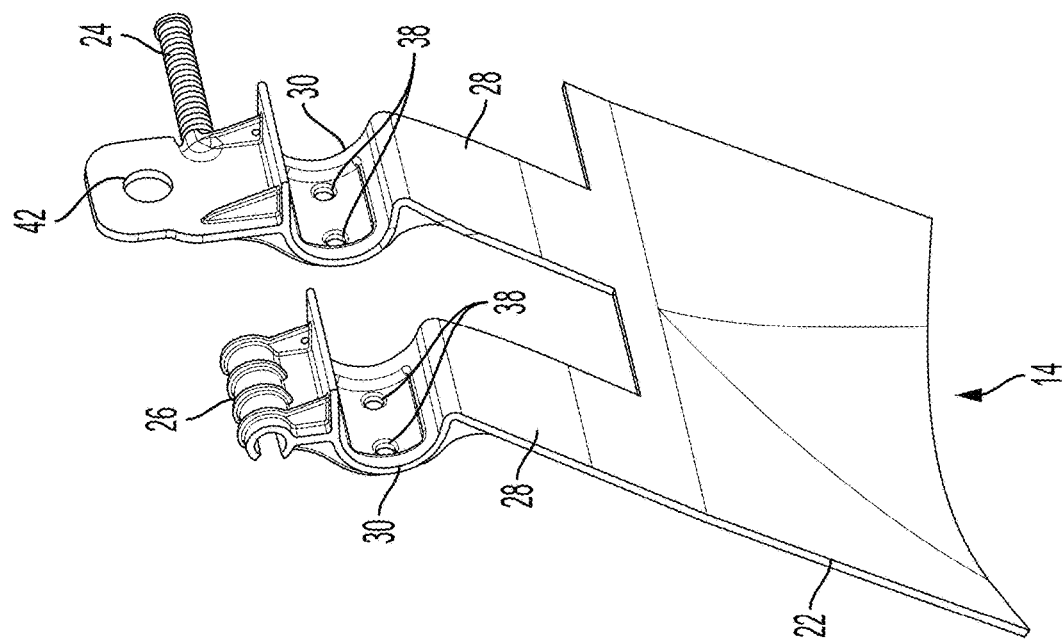

In some embodiments, sections 14, 16 have an identical shape—such that assembly 10 can be formed by connecting the two identical sections to one another with one of the two sections offset 180 degrees from the other section as shown in FIG. 7. Thus, assembly 10 has a reduced number of components that improves the ease of manufacture and assembly.

Each section 14, 16 has an outer surface 22, a hinge pin 24, a hinge knuckle 26, and one or more extension arms 28 (two shown). In the illustrated embodiment, hinge pin 24 depends from a first extension arm 28, while hinge knuckle 26 depends from a second extension arm 28. During assembly, hinge pin 24 of section 14 is pivotally secured in hinge knuckle 26 of section 16, while the hinge pin 24 of section 16 is pivotally secured in hinge knuckle 26 of section 14. When secured to one another, hinge pins 24 and hinge knuckles 26 are disposed along hinge axis 18 so that sections 14, 16 can move about the hinge axis.

In some embodiments, knuckle 26 resiliently flexes to secure pin 24 in the knuckle, while allowing movement of sections 14, 16 about hinge axis 18. Of course, other connections between pin 24 and knuckle 26 that allow for pivoting movement about hinge axis 18 are contemplated by the present disclosure.

Each of the arms 28 further includes a conductor capturing region 30. In the illustrated embodiment, region 30 is semi-circular in shape so that—when assembled and biased to the position of FIG. 1—two of the regions form a generally circular conductor receiving area 32.

Sections 14, 16 are made of any insulating material having sufficient strength and toughness to withstand ambient environmental conditions, while having sufficient resilience to allow knuckle 26 to flex over pin 24 during assembly. In some embodiments, sections 14, 16 are made of polypropylene, nylon, ABS plastics, and other polymeric materials.

Outer surface 22 can be made of or coated with a reflecting material, namely one that reflects light to enhance visibility. In addition or as an alternative to surface 22 being reflective, the surface can be made of or coated with an emitting material that glows in the dark after being exposed to sunlight to enhance visibility at times of low ambient light. For example, surface 22 can be made of or coated with an emitting material such as, but not limited to, luminescent materials, phosphorescent materials, radioactive materials, photosensitive materials, and others. When both reflective and emitting, surface 22 can reflect light when ambient light is available and can emit light for a period of time when no ambient light is available.

Surface 22 can, in some embodiments, be planar or non-planar. For example, surface 22 is shown in the exemplary embodiments having a non-planar shape that has an outwardly convex curvature, which is believed—without wishing to be bound by any particular theory—to provide a visibility to reflections from a plurality of flight angles.

It should be recognized that surface 22 is shown as having a curved, convex shape by way of example only. Of course, it is contemplated by the present disclosure for surface 22 to have a plurality of planar facets configured to provide a non-planar shape or combinations of curved and planar facets.

It should also be recognized that assembly 10 is described as having surface 22 with reflective and/or emitting properties. Of course, it is contemplated by the present disclosure for other portions of assembly 10 to have reflective and/or emitting properties including any or all of the first and second sections 14, 16 such as, but not limited to, knuckle 26, arms 28, conductor capturing region 30, and inner surfaces 44.

In some embodiments, sections 14, 16 can further include one or more gripping pads 34. Pads 34 are formed of insulating material for contact with conductor 12. Pads 34 can in some embodiments be soft enough to conform to conductor 12 under the force of biasing member 20. In some embodiments, pads 34 are made of TPU, TPE, silicone, rubber, and other low durometer polymeric materials.

Figure 8:
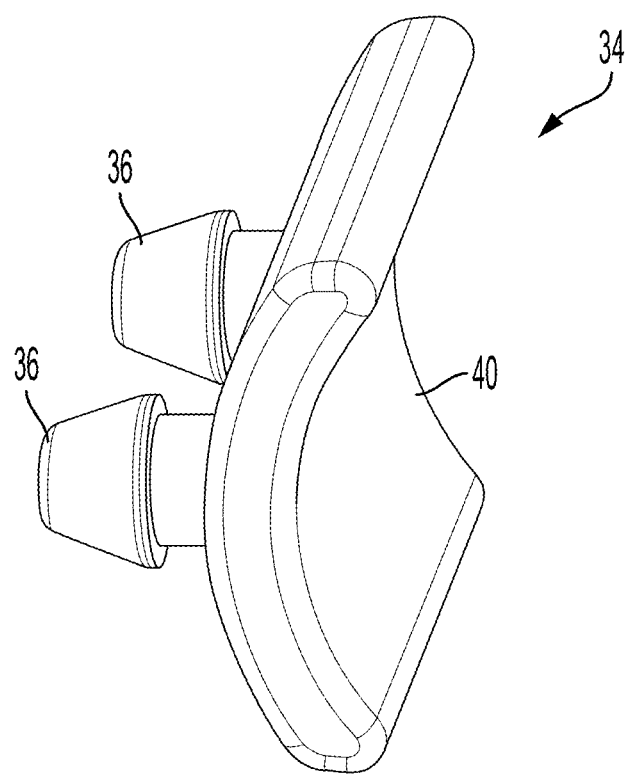
FIG. 8 is a perspective view of a gripping pad for optional use with the flight diverter assembly of FIG. 1.
Figure 9:
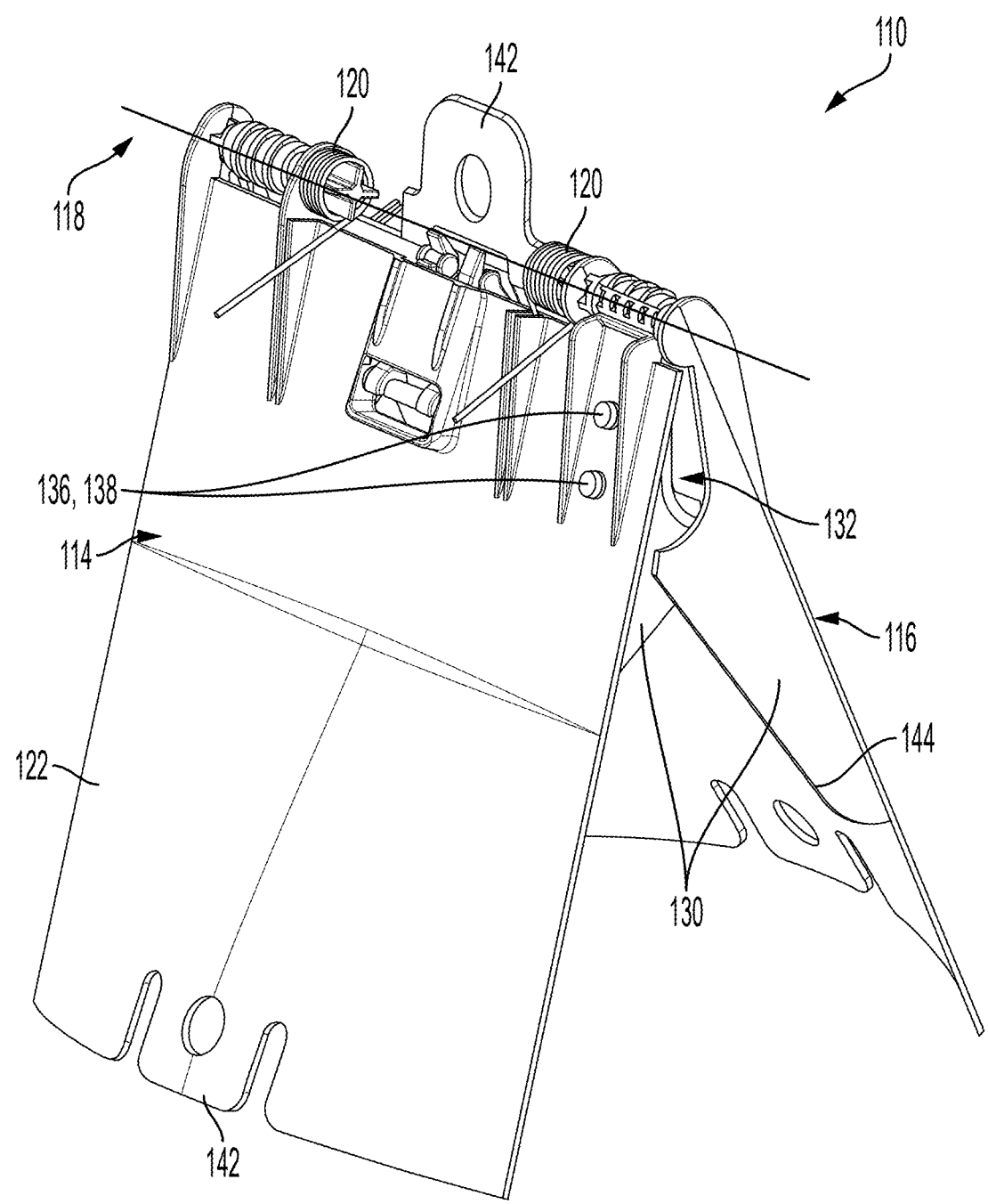
FIG. 9 is a front perspective view of an alternate exemplary embodiment of a flight diverter assembly according to the present disclosure in a closed position.
Figure 10:
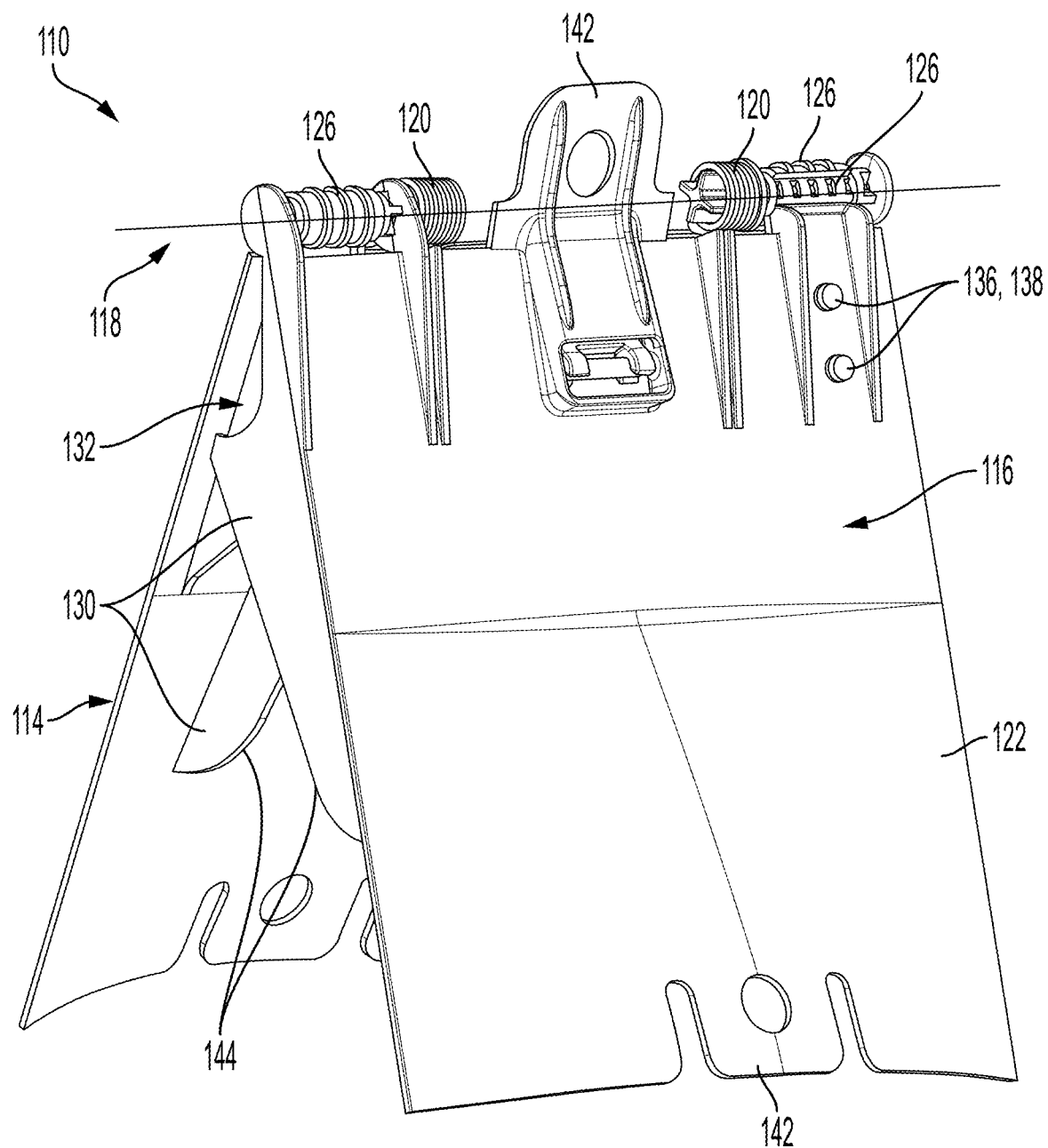
FIG. 10 is a rear perspective view of the flight diverter assembly of FIG. 9.
Figure 11:
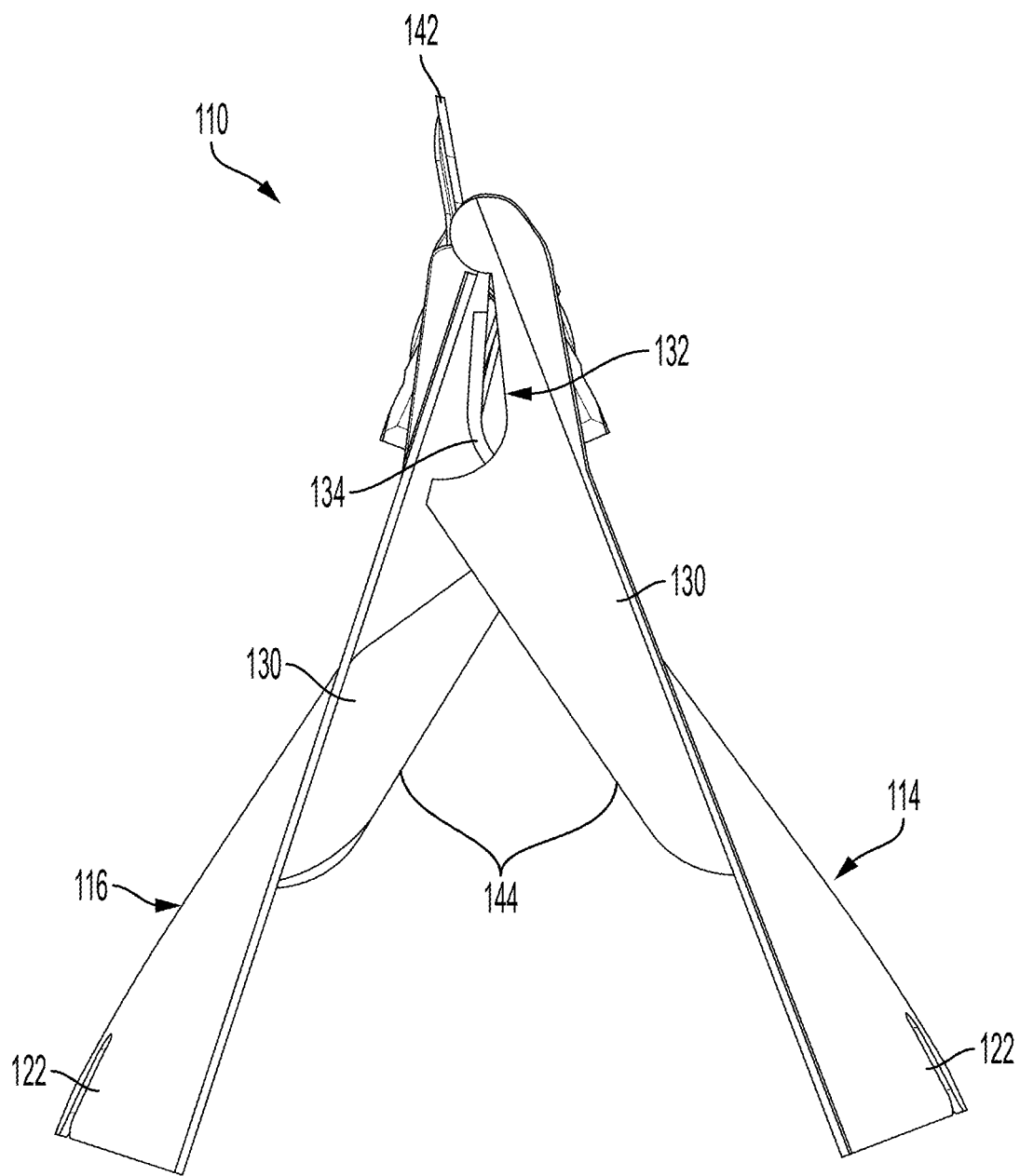
FIG. 11 is a side view of the flight diverter assembly of FIG. 9.
Figure 12:
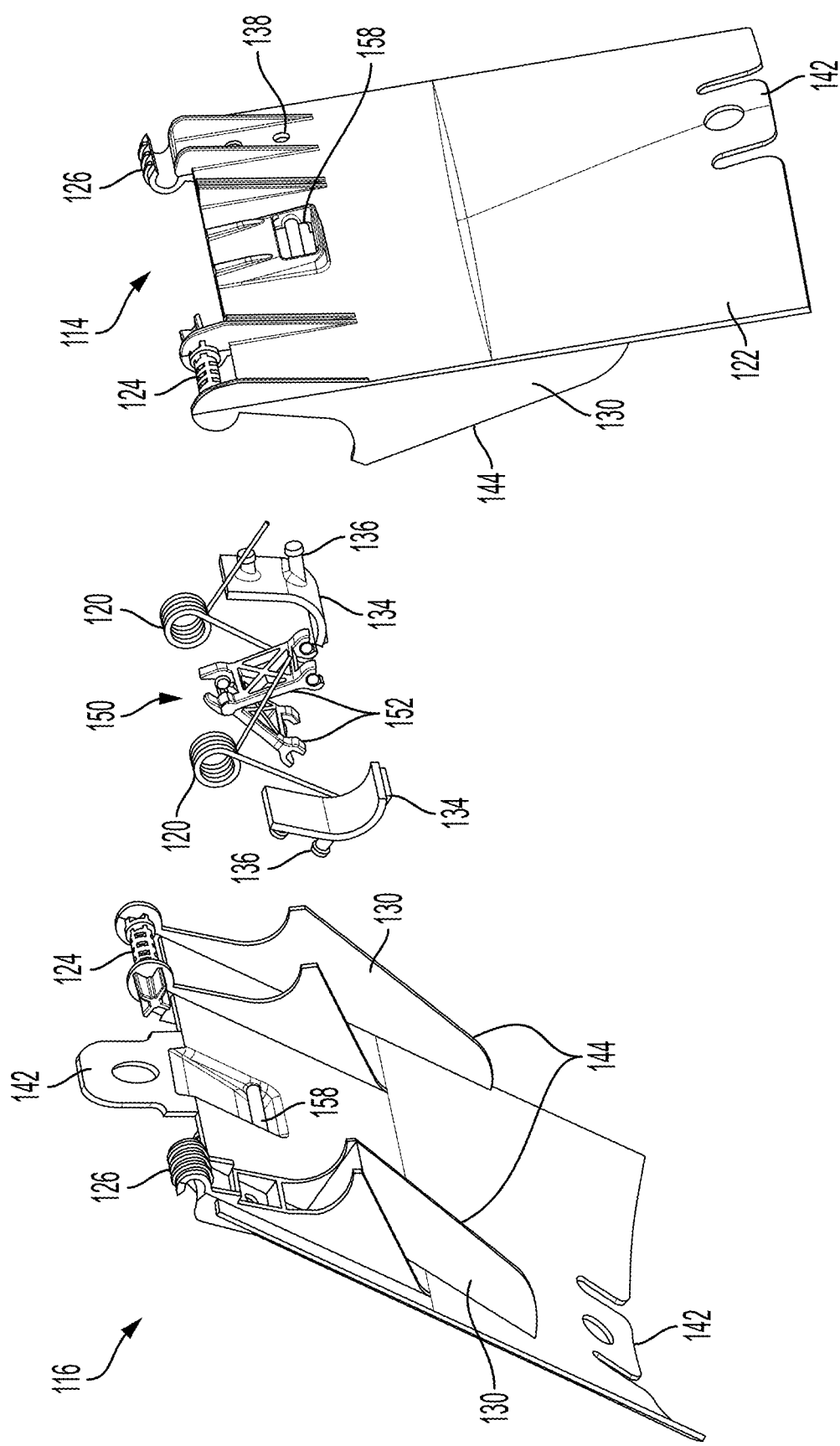
FIG. 12 is an exploded view of the flight diverter assembly of FIG. 9.

An exemplary embodiment of pad 34 is shown in FIG. 8. Pads 34 can be secured to sections 14, 16 in any desired manner, such as but not limited to, mechanical connections, adhesive connections, thermal connections, and combinations thereof.

In the illustrated embodiment, pad 34 is shown mechanically connected to sections 14, 16. Here, pad 34 includes one or more connecting prongs 36. Prongs 36 are configured to mate with openings 38 defined in region 30 of arms 28 shown in FIG. 7, which secures pad 34 to sections 14, 16 in area 32.

Pad 34 can further include a curved gripping surface 40 configured to provide a secure grip on conductor 12.

Biasing member 20 can be any member sufficient to provide a biasing force to sections 14, 16 about hinge axis 18 to bias the sections to the normally closed position (FIG. 3) and to provide a clamping force secure conductor 12 in area 32 when in use. In the illustrated embodiment, biasing member 20 is shown as a torsion spring. Of course, other biasing members 20 such as, but not limited to, compression springs, extension springs, and others are contemplated for use by the present disclosure.

At least one of section 14, 16 can, in some embodiments, further include a hotstick engaging region 42. Region 42 can be as simple as an opening that can be engaged by a hook of a hotstick (not shown) in a known manner. In this manner, assembly 10 can be engaged by the hotstick and safely installed onto conductor 12 while the conductor is energized.

In the illustrated embodiment, sections 14, 16 are identical and, thus, each section has a single engaging region 42. Of course, it is contemplated by the present disclosure for only one section 14, 16 to have engaging region 42 and/or for each section to have multiple engaging regions 42.

Engaging region 42 is shown in the illustrated embodiment as a separate tab that depends from sections 14, 16 above hinge axis 18. However, it is contemplated by the present disclosure for region 42 be disposed on any portion of assembly 10. For example, region 42 can be positioned in the lower portion having surface 22 and/or can be a separate tab that depends from the lower portion having surface 22.

Figure 4:
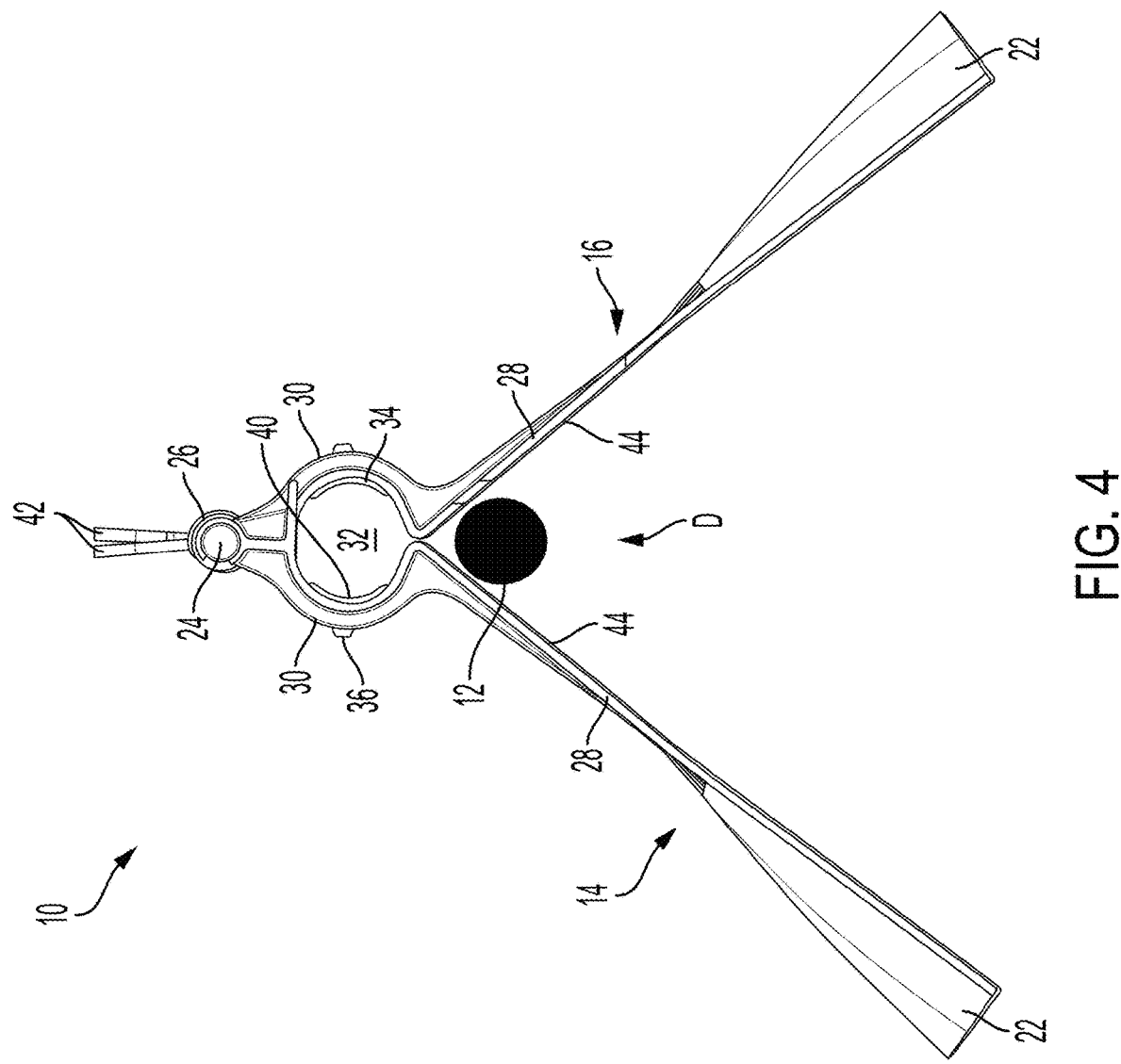
FIG. 4 is a side view of the flight diverter assembly of FIG. 1 shown during installation of the aerial conductor.
Figure 5:
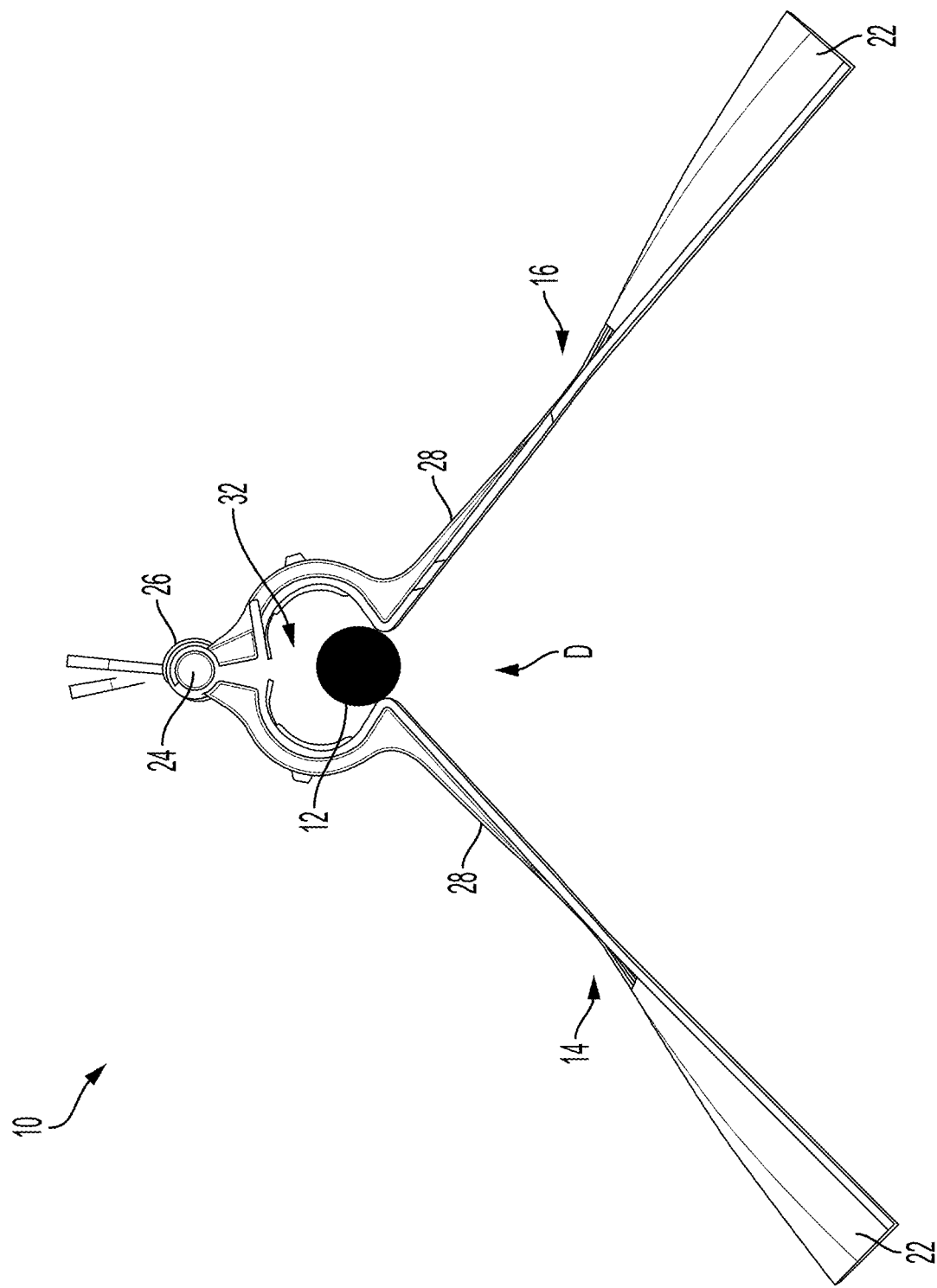
FIG. 5 is a side view of the flight diverter assembly of FIG. 1 shown during installation of the aerial conductor.

The installation of assembly 10 onto conductor 12 is described in more detail with respect to FIGS. 3-5.

Assembly 10 and conductor 12 are move with respect to one another. In some embodiments, assembly 10 is moved with respect to conductor 12 in an installation direction D. However, assembly 10 is configured to be installed by movement of conductor 12 into the assembly in a direction opposite direction D and/or for the assembly to be moved in direction D while the conductor is moved in the opposite direction.

When engaging region 42 is present, the engaging region can be used to grasp assembly 10 via the hotstick so that the assembly can be moved in direction D by the hotstick.

During installation, conductor 12 acts on an inner surface 44 of sections 14, 16, namely of the lower portion having outer surface 22 and of arms 28. In this manner, inner surfaces 44 act as cam surfaces to move sections 14, 16 about hinge axis 18 from the normally closed position (FIG. 3) to the open position (FIG. 6) by overcoming the biasing force of member 20.

The movement in direction D is continued until conductor 12 is received in area 32, which is defined by conductor capturing regions 30 of sections 14, 16. Once received in area 32, biasing member 20 normally biases sections 14, 16 back towards the closed position, providing a gripping force on conductor 12. Further, and when present, gripping pads 34 can provide additional contact and grip on conductor 12.

In this manner, assembly 10 provides a simple design that splays open when pushed over the conductor 12 so attach itself onto the line with biasing member 18 providing a clamping force on the conductor with extra line retention being provided by gripping pads 34, when present. Thus, assembly 10 is configured to be installed by the simple movement by a single hotstick in direction D.

Assembly 10 has been configured with enhanced durability and operation by positioning of the various components.

For example and as shown in FIG. 1, pin 24 depends from region 42 such that the region is between—along hinge axis 18—the connection of pins 24 and knuckles 26. In this manner, forces imposed on region 42 along direction D during installation are supported at both sides by pins 24 and knuckles 26, respectively.

In another example shown in FIG. 3 and moving from top to bottom along direction D, region 42 is positioned above hinge axis 18, biasing member 20 is positioned around hinge axis 18, hinge axis 18 is positioned above conductor receiving area 32, and conductor receiving area 32 is positioned above inner surfaces 44.

In this manner, forces imparted onto region 42 during installation are centralized above the moving components of assembly 10. Further, forces imparted onto inner surfaces 44 during installation are farthest from hinge axis 18, which provides the maximum leverage possible to overcome the biasing force of member 20.

Figure 6:
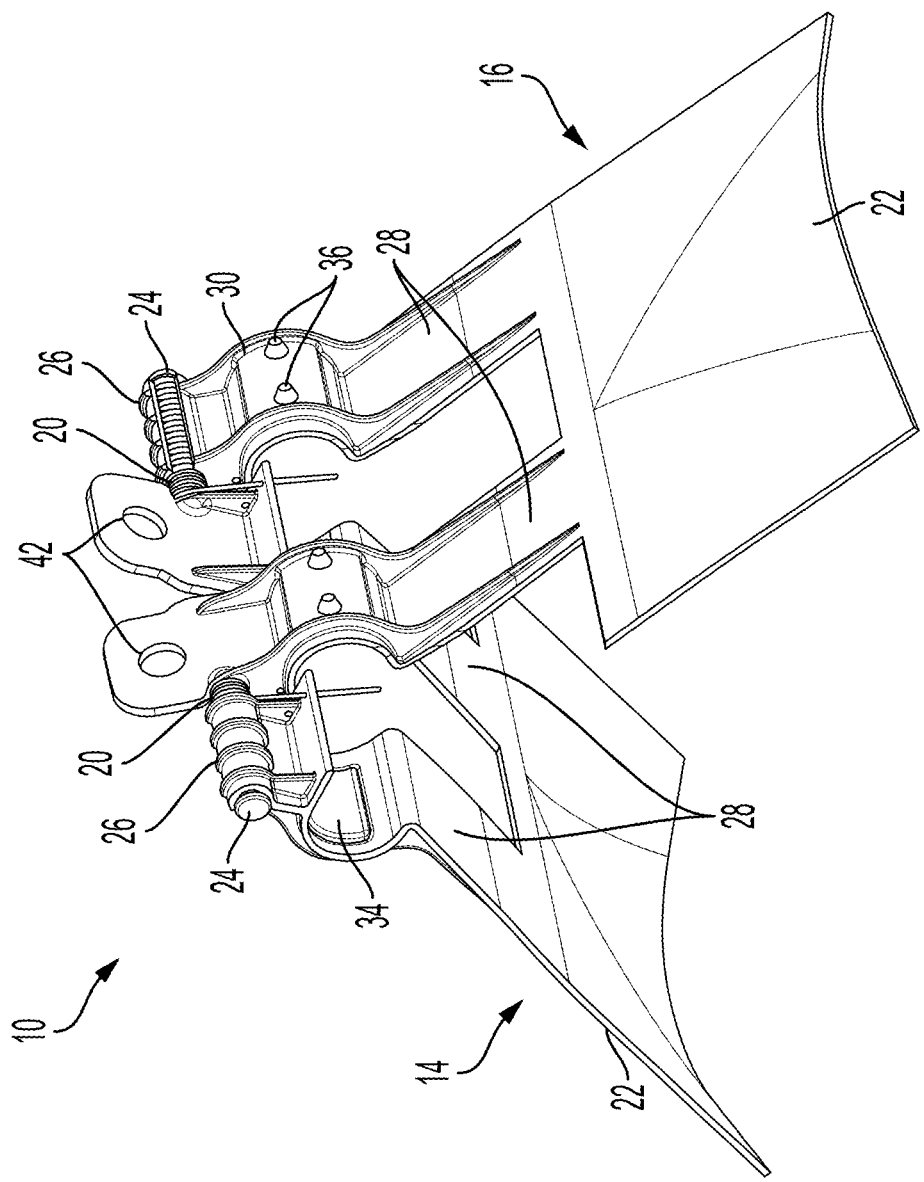
FIG. 6 is a perspective view of the flight diverter assembly of FIG. 1 in an open position with the aerial conductor omitted for purposes of clarity.

As another example, extension arms 28 are configured so that the arms cross one another in the closed position (FIG. 3) and are uncrossed from one another in the open position (FIG. 6). In this manner, assembly 10 has a more compact design, which assists in guiding conductor 12 between sections 14, 16 and into contact with inner surfaces 44 during installation.

As still another example, assembly 10 is configured so as to be connectable a wide range of sizes of conductor 12 via one or more of the position of hinge axis 18 above conductor receiving area 32, the position and shape of conductor capturing regions 30, the location of biasing of member 20, and pads 34. In some embodiments, pads 34 of differing sizes can be used to further increase the range of conductor sizes that assembly 10 can accommodate.

In some embodiments, assembly 10 is configured so that the lower portion having surface 22 and arms 28 are connected to one another in a manner that allows movement therebetween about other hinge axes that are parallel to axis 18. For example, sections 14, 16 can be formed with a living hinge or area of reduced sectional areal between the lower portion having surface 22 and arms 28. The movement of surface 22 with respect to arms 28 can reduce the cross-sectional area of assembly 10 during high wind and/or can increase the visibility by changing the position of surface 22 with respect to incident light so as to provide enhanced reflectance/emittance.

Of course, it is contemplated for assembly 10 to be configured so that the lower portion having surface 22 and arms 28 are connected by other movable connections including, but not limited to, hinge pins and knuckles as described above.

Referring to the drawings and in particular to FIGS. 9-17, an alternate exemplary embodiment of a flight diverter assembly according to the present disclosure is shown and is generally referred to by reference numeral 110. Assembly 110 has a simple design that is easy to make, assemble, and install. Moreover, assembly 110 is configured for installation onto a conductor 112 using a lineman hotstick, which allows installation while the conductor is energized.

Figure 13:
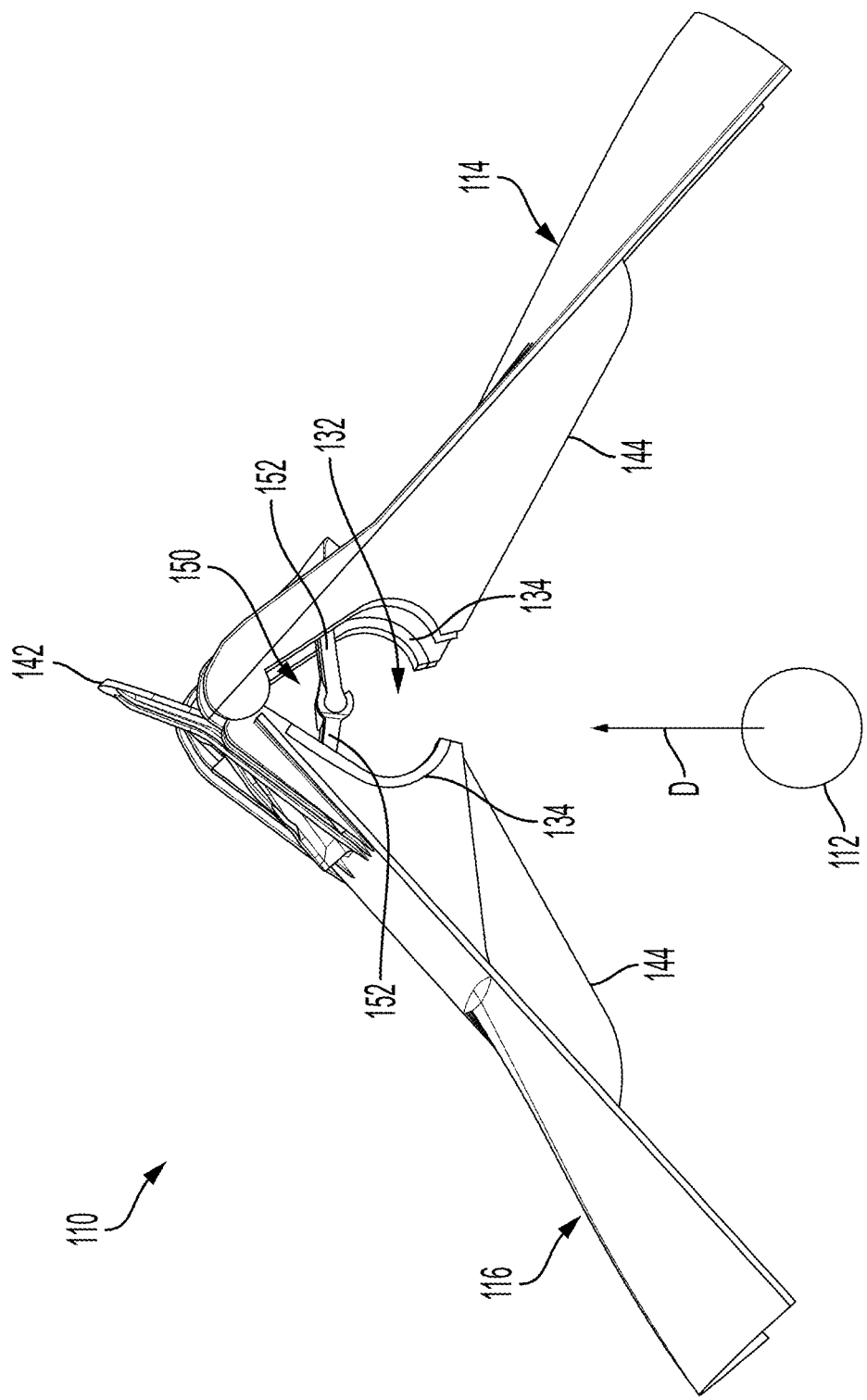
FIG. 13 is a side view of the flight diverter assembly of FIG. 9 shown in an open position.
Figure 14:
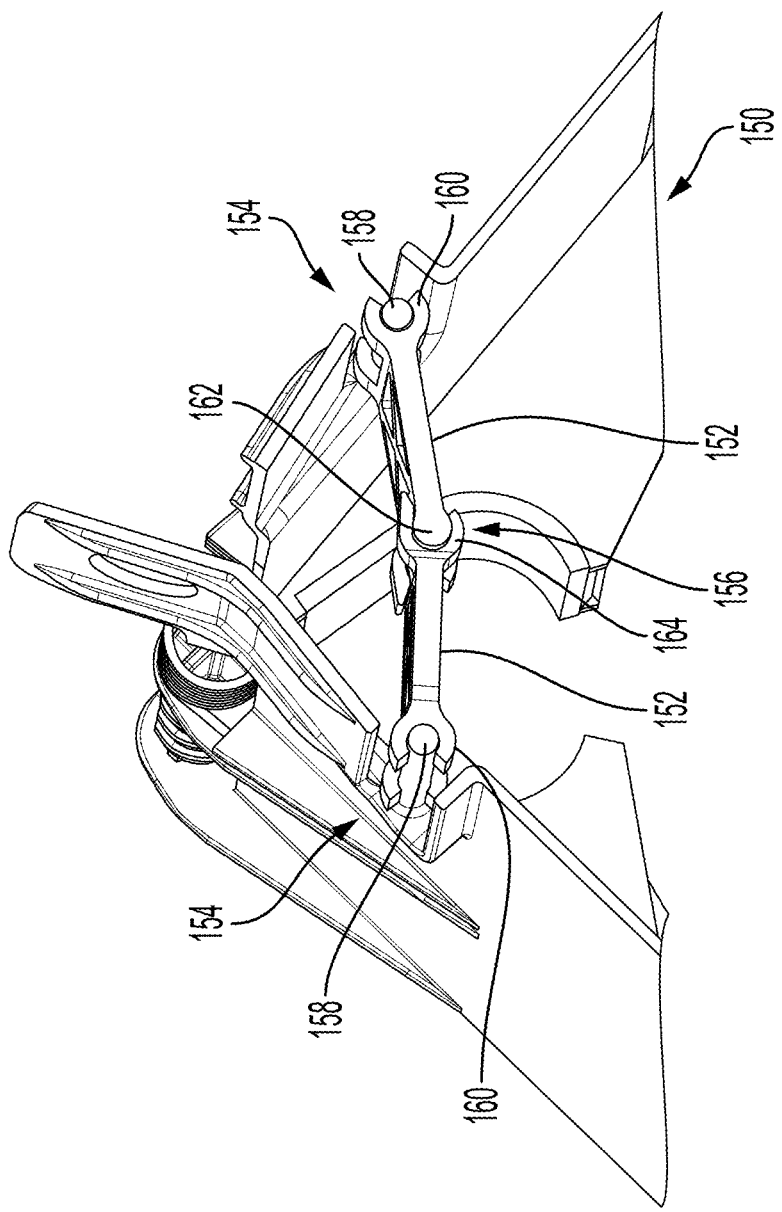
FIG. 14 is an enlarged partial view of a toggle action lever mechanism of FIG. 13.

Assembly 110 includes a first section 114 and a second section 116 that are connected along a hinge axis 118 and biased via one or more biasing member 120 to a closed position (FIGS. 9-11 and 17). Assembly 110 is configured so that sections 114, 116 splay open about hinge axis 118 to an open position (FIGS. 13-14).

Advantageously, assembly 110 includes a toggle action lever mechanism 150 configured to releasably hold sections 114, 116 in the open position during installation onto conductor 112. Lever mechanism 150, when in the open position, holds sections 114, 116 in the open position against the action of biasing members 120. However, movement of lever mechanism 150 from the open position to an over center or toggled position allows biasing members 120 to close sections 114, 116—and allows the biasing members to hold the sections in the closed position around conductor 112 as will be described in more detail below.

Each section 114, 116 has an outer surface 122, a hinge pin 124, and a hinge knuckle 126. During assembly, hinge pin 124 of section 114 is pivotally secured in hinge knuckle 126 of section 116, while the hinge pin 124 of section 116 is pivotally secured in hinge knuckle 126 of section 114. When secured to one another, hinge pins 124 and hinge knuckles 126 are disposed along hinge axis 118 so that sections 114, 116 can move about the hinge axis.

In some embodiments, knuckle 126 resiliently flexes to secure pin 124 in the knuckle, while allowing movement of sections 114, 116 about hinge axis 118. Of course, other connections between pin 124 and knuckle 126 that allow for pivoting movement about hinge axis 118 are contemplated by the present disclosure.

Each of the section 114, 116 further includes one or more conductor capturing regions 130. In the illustrated embodiment, regions 130 are shaped so that—when assembled and biased to the closed position—the regions on sections 114, 116 form a conductor receiving area 132 therebetween.

Sections 114, 116 are made of any insulating material having sufficient strength and toughness to withstand ambient environmental conditions, while having sufficient resilience to allow knuckle 126 to flex over pin 124 during assembly. In some embodiments, sections 114, 116 are made of polypropylene, nylon, ABS plastics, and other polymeric materials.

Outer surface 122 can be made of or coated with a reflecting material, namely one that reflects light to enhance visibility. In addition or as an alternative to surface 122 being reflective, the surface can be made of or coated with an emitting material that glows in the dark after being exposed to sunlight to enhance visibility at times of low ambient light. For example, surface 122 can be made of or coated with an emitting material such as, but not limited to, luminescent materials, phosphorescent materials, radioactive materials, photosensitive materials, and others. When both reflective and emitting, surface 122 can reflect light when ambient light is available and can emit light for a period of time when no ambient light is available.

Outer surface 122 can, in some embodiments, be planar or non-planar. For example, surface 122 is shown in the exemplary embodiments having a non-planar shape that has an outwardly convex curvature, which is believed—without wishing to be bound by any particular theory—to provide a visibility to reflections from a plurality of flight angles.

It should be recognized that surface 122 is shown as having a curved, convex shape by way of example only. Of course, it is contemplated by the present disclosure for surface 122 to have a plurality of planar facets configured to provide a non-planar shape or combinations of curved and planar facets.

It should also be recognized that assembly 110 is described as having surface 122 with reflective and/or emitting properties. Of course, it is contemplated by the present disclosure for other portions of assembly 110 to have reflective and/or emitting properties including any or all of the first and second sections 114, 116 such as, but not limited to, knuckle 126, conductor capturing regions 130, and one or more inner surfaces.

In some embodiments, sections 114, 116 can further include one or more gripping pads 134. Pads 134 are formed of insulating material for contact with conductor 112. Pads 134 can in some embodiments be soft enough to conform to conductor 112 under the force of biasing members 120. In some embodiments, pads 134 are made of TPU, TPE, silicone, rubber, and other low durometer polymeric materials.

Pads 134 can be secured to sections 114, 116 in any desired manner, such as but not limited to, mechanical connections, adhesive connections, thermal connections, and combinations thereof.

In the illustrated embodiment, pad 134 is shown mechanically connected to sections 114, 116. Here, pad 134 includes one or more connecting prongs 136. Prongs 136 are configured to mate with openings 138 defined in region 130 to secure pads 134 to sections 114, 116 in areas 132.

Pad 134 can further include a curved gripping surface configured to provide a secure grip on conductor 112.

Biasing member 120 can be any member sufficient to provide a biasing force to sections 114, 116 about hinge axis 118 to bias the sections to the normally closed position and to provide a clamping force secure the conductor in area 132 when in use. In the illustrated embodiment, biasing member 120 is shown as a torsion spring. Of course, other biasing members 120 such as, but not limited to, compression springs, extension springs, and others are contemplated for use by the present disclosure.

At least one of section 114, 116 can, in some embodiments, further include a hotstick engaging region 142. Region 142 can be as simple as an opening that can be engaged by a hook of a hotstick (not shown) in a known manner. In this manner, assembly 110 can be engaged by the hotstick and safely installed onto conductor 112 while the conductor is energized.

Engaging region 142 can depend from one or more of sections 114, 116 above hinge axis 118. Additionally or alternatively, region 142 can be disposed in a lower portion of surface 122 and/or can be a separate tab that depends from the lower portion of the surface.

Figure 15:
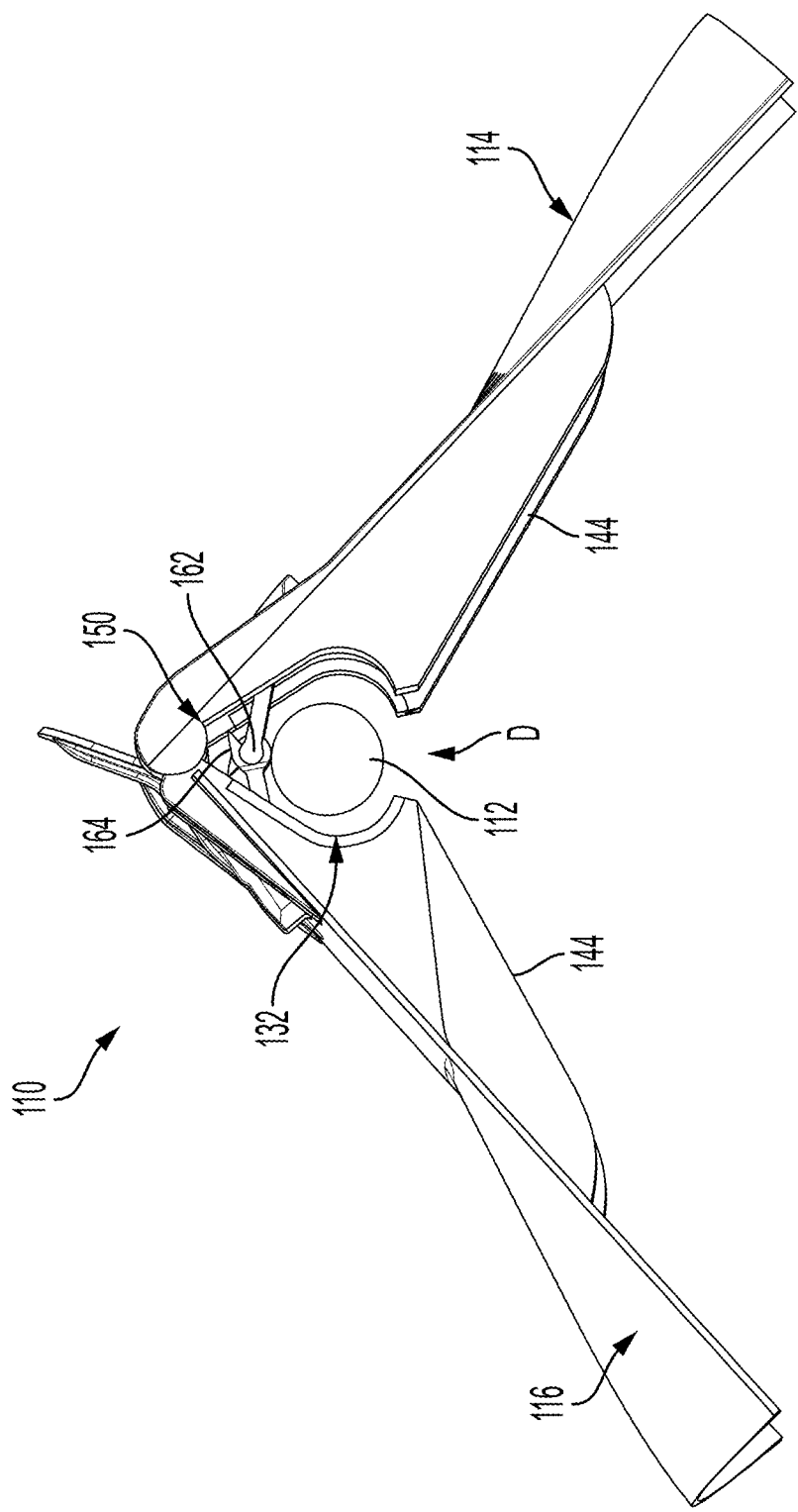
FIG. 15 is a side view of the flight diverter assembly shown after movement of the toggle action lever mechanism to an over center position.
Figure 16:
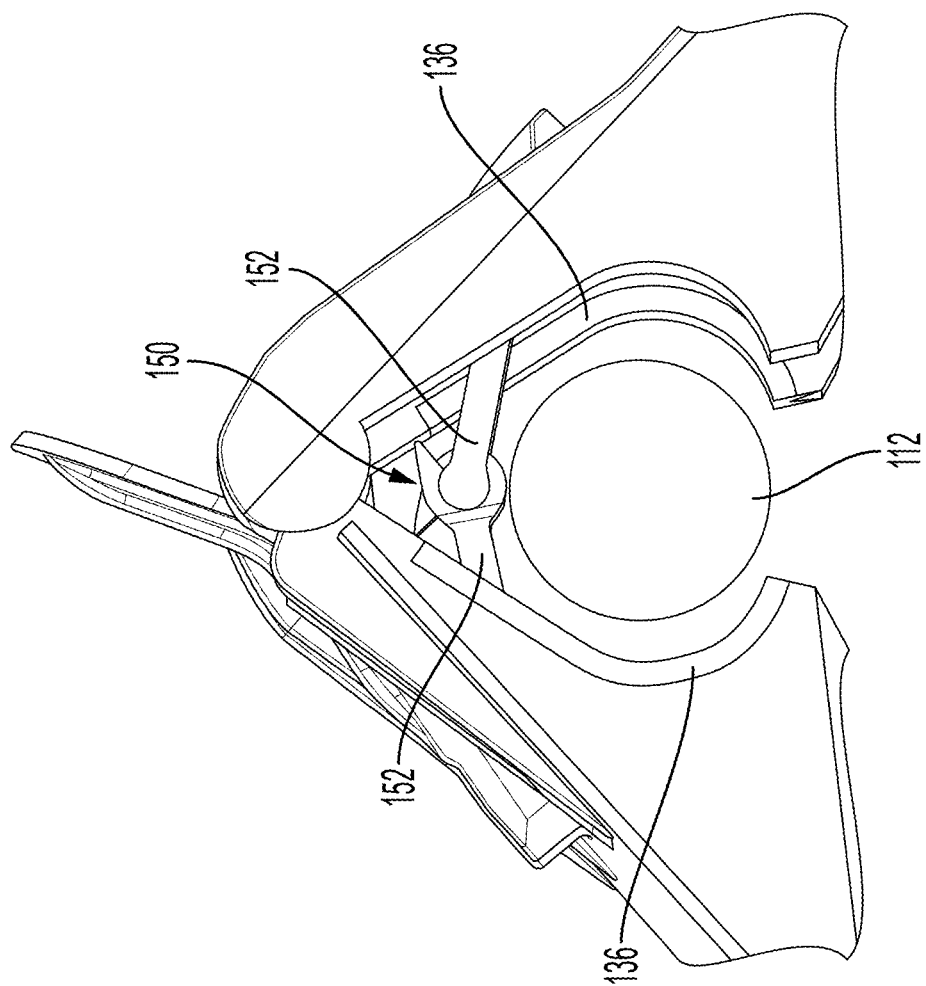
FIG. 16 is an enlarged partial view of a toggle action lever mechanism of FIG. 15.
Figure 17:
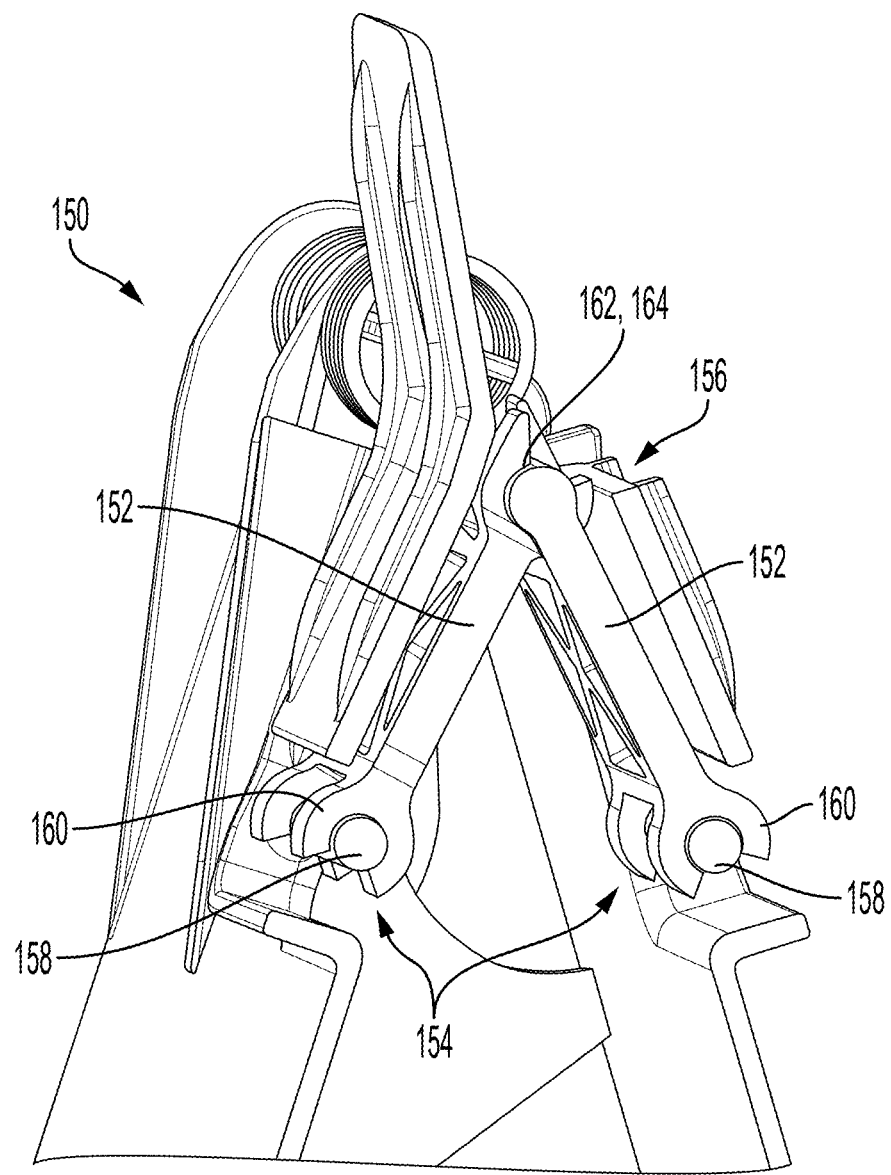
FIG. 17 is an enlarged partial view of the toggle action lever mechanism in a closed position.

Lever mechanism 150 is disclosed in more detail with simultaneous reference to FIGS. 13, 15, and 17. Lever mechanism 150 has an over-center lock point (i.e., the open position of FIG. 13). Once lever mechanism 150 is in the over-center position, sections 114, 116 cannot move or close unless the lever mechanism is moved from this over-center position.

In some embodiments, assembly 110 can include a fixed stop that defines the open position of lever mechanism 150, where the fixed stop can be formed by a normal travel of biasing members 120. In other embodiments, assembly 110 can include a fixed stop formed by interference of engaging region 142 on one of sections 114, 116 above hinge axis 118 with a portion of an opposing section 114, 116. Of course, it is contemplated by the present disclosure for assembly 110 to have fixed stop defined by any other manner.

Lever mechanism 150 is positioned between sections 114, 116 so that the lever mechanism contacts or interacts with a portion of conductor 112 during installation of the assembly. Thus, the same movement used to move assembly 110 onto conductor 112 also results in movement of lever mechanism 150 from the over-center position of FIGS. 13-14 to the position shown in FIGS. 15-16, then to the closed position of FIG. 17 under the action of biasing members 120 such that receiving areas 132 are closed on the conductor.

Lever mechanism 150 can be any over-center toggle mechanism. In the illustrated embodiment, lever mechanism 150 has two levers 152 that have a first pivot point 154 at sections 114, 116, respectively, and a central pivot point 156.

In the illustrated embodiment, each section 114, 116 is shown having a second hinge pin 158 and each lever 152 is shown having a second hinge knuckle 160—where during assembly—the second hinge pins 158 are pivotally secured in the second hinge knuckles 160. Further, one lever 152 is show with a third hinge pin 162 that is pivotally secured in a third hinge knuckle 164 of the other lever 152. When levers 152 are secured to one another and to sections 114, 116, the levers move with respect to one another as the sections are moved back and forth between the open and closed positions.

In some embodiments, knuckles 160, 164 resiliently flex to secure pins 158, 162, while allowing movement of levers 152 and sections 114, 116. Of course, other connections between the pins and knuckles that allow for pivoting movement are contemplated by the present disclosure.

The contact or interaction between conductor 112 and lever mechanism 150 is sufficient to move the lever mechanism out of the over-center position, with both levers 152 pivoting about pivot points 154, 156, respectively. The movement of levers 152, aided by biasing members 120, pulls sections 114, 116 inward towards one another, capturing conductor 112 between the sections.

In the illustrated embodiment, conductor capturing regions 130 further include a sloped or tapered cam surface 144 that leads or guides conductor 112 towards the capturing region. Moreover and when conductor 112 has a larger dimension than region 130 when in the closed position as shown in FIG. 17, the conductor acts on an inner surface 144 to move sections 114, 116 about hinge axis 118 overcoming the biasing force of member 120 until the conductor is received in the capturing region.

The installation of assembly 110 onto conductor 112 is now described in more detail.

Assembly 110 and conductor 112 are move with respect to one another in an installation direction D. Conductor 112 is guided by cam surfaces 144 towards capturing region 130 where the conductor contacts lever mechanism 150 to move the mechanism from the over-center position (FIGS. 13-14) to the position shown in FIGS. 15-16, then to the closed position of FIG. 17 under the action of biasing members 120 such that receiving areas 132 are closed on the conductor.

Thus, assembly 110 provides a simple design that is splayed open and held in the open position by lever mechanism 150 while being installed on conductor 112—then moves to the closed position using the toggling action of the lever mechanism, the spring force of biasing members 120, and the movement of the assembly in direction D. Thus, assembly 110 can be installed by the simple movement by a single hotstick in direction D.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

| PARTS LIST |
| --- |
| flight diverter assembly 10 |
| conductor 12 |
| first section 14 |
| second section 16 |
| hinge axis 18 |
| biasing member 20 |
| outer surface 22 |
| hinge pin 24 |
| hinge knuckle 26 |
| extension arms 28 |
| conductor capturing region 30 |
| conductor receiving area 32 |
| gripping pad 34 |
| connecting prongs 36 |
| openings 38 |
| curved gripping surface 40 |
| hotstick engaging region 42 |
| installation direction (D) |
| inner surface 44 |
| flight diverter assembly 110 |
| conductor 112 |
| first section 114 |
| second section 116 |
| hinge axis 118 |
| biasing member 120 |
| an outer surface 122 |
| hinge pin 124 |
| hinge knuckle 126 |
| conductor capturing region 130 |
| conductor receiving area 132 |
| gripping pad 134 |
| prongs 136 |
| openings 138 |
| hotstick engaging region 142 |
| sloped or tapered cam surface 144 |
| toggle action lever mechanism 150 |
| levers 152 |
| first pivot point 154 |
| central pivot point 156 |
| second hinge pin 158 |
| second hinge knuckles 160 |
| third hinge pin 162 |
| third hinge knuckle 164 |
| installation direction D |

What is claimed is:

1. A flight diverter assembly, comprising:

a first section having a first outer surface;

a second section having a second outer surface, the first section being movably secured to the second section for movement about a hinge axis between an open position and a closed position;

a pair of biasing members normally biasing the first and second sections to the closed position; and a toggle action lever mechanism connected to the first and second sections, the toggle action lever mechanism having an over-center position that corresponds with the open position, wherein the toggle action lever mechanism releasably holds the first and second sections in the open position when in the over-center position, wherein the toggle action lever mechanism is positioned between the first and second sections such that, during installation on a conductor, the conductor interacts with the toggle action lever mechanism to move the toggle action lever mechanism from the over-center position to allow the pair of biasing members and the toggle action lever mechanism to move the first and second sections to the closed position, wherein the pair of biasing members are positioned on opposite sides of the toggle action lever, and wherein the first section has a first hinge pin and a first hinge knuckle and the second section has a second hinge pin and a second hinge knuckle, the first hinge pin being movably secured to the second hinge knuckle and the second hinge pin being movably secured to the first hinge knuckle, the hinge axis being defined through the first and second hinge pins.

2. The assembly of claim 1, wherein the first section and the second section have an identical shape or a different shape.

3. The assembly of claim 1, wherein the first section and/or the second section have a feature selected from a group consisting of a planar outer surface, a non-planar outer surface, a convex outer surface, and combinations thereof.

4. The assembly of claim 1, wherein the first section and the second section have a feature selected from a group consisting of a reflective material, an emittance material, and combinations thereof.

5. The assembly of claim 1, wherein each biasing member is a torsion spring positioned about the hinge axis in the open and closed positions.

6. The assembly of claim 1, wherein the first section and/or the second section further comprises a hotstick engaging region that is positioned above the hinge axis.

7. The assembly of claim 1, wherein the first section and/or the second section further comprises a hotstick engaging region positioned at a lower edge.

8. The assembly of claim 1, wherein the first section comprises a first conductor capturing region and the second section comprises a second conductor capturing region, the first and second conductor capturing region defining, when in the closed position, a conductor receiving area therebetween.

9. The assembly of claim 8, further comprising a first gripping pad disposed in the first conductor capturing region and a second gripping pad disposed in the second conductor capturing region.

10. The assembly of claim 9, wherein the first and second gripping pads each further comprise connecting prongs and wherein the first and second sections each further comprise openings positioned and configured to receive the connecting prongs to secure the first and second gripping pads in the first and second conductor capturing regions, respectively.

11. The assembly of claim 8, wherein the first and second conductor capturing regions further comprise a surface configured to lead or guide the conductor towards the conductor receiving area.

12. The assembly of claim 1, wherein the pair of biasing members are selected from a group consisting of a torsion spring, a compression spring, and an extension spring.

13. A flight diverter assembly, comprising:
a first section having a first outer surface;
a second section having a second outer surface, the first section being movably secured to the second section for movement about a hinge axis between an open position and a closed position;
a pair of biasing members normally biasing the first and second sections to the closed position;
a toggle action lever mechanism connected to the first and second sections, the toggle action lever mechanism having an over-center position that corresponds with the open position, wherein the toggle action lever mechanism releasably holds the first and second sections in the open position when in the over-center position;
a conductor receiving area defined by the first and second sections when in the closed position;
a first gripping pad having a first connecting prong received in a first connecting opening of the first section; and
a second gripping pad having a second connecting prong received in a second connecting opening of the second section, wherein the first and second gripping pads are in the conductor receiving area,
wherein the toggle action lever mechanism is positioned between the first and second sections such that, during installation on a conductor, the conductor interacts with the toggle action lever mechanism to move the toggle action lever mechanism from the over-center position to allow the pair of biasing members and the toggle action lever mechanism to move the first and second sections to the closed position, and
wherein the pair of biasing members are positioned on opposite sides of the toggle action lever.

14. A flight diverter assembly, comprising:
a first section having a first outer surface, a first hinge pin, and a first hinge knuckle, wherein the first outer surface has a first lower edge remote from the first hinge pin and knuckle;
a second section having a second outer surface, a second hinge pin, and a second hinge knuckle, wherein the second outer surface has a second lower edge remote from the first hinge pin and knuckle, the first hinge pin being movably secured to the second hinge knuckle and the second hinge pin being movably secured to the first hinge knuckle so that the first and second sections are movable about a hinge axis between an open position and a closed position, the hinge axis being defined through the first and second hinge pins,
a biasing member normally biasing the first and second sections to the closed position; and
a toggle action lever mechanism connected to the first and second sections, the toggle action lever mechanism having an over-center position that corresponds with the open position, wherein the toggle action lever mechanism releasably holds the first and second sections in the open position when in the over-center position,
wherein the toggle action lever mechanism is positioned between the first and second sections such that, during installation on a conductor, the conductor interacts with the toggle action lever mechanism to move the toggle action lever mechanism from the over-center position to allow the biasing member and the toggle action lever mechanism to move the first and second sections to the closed position, wherein the first and second lower edges are, when in the open and closed positions, spaced from one another, and wherein the biasing member comprises a first spring on the first hinge pin and a second spring on the second hinge pin, and wherein the toggle action lever mechanism is positioned between the first and second springs.

15. The assembly of claim 14, further comprising:
a conductor receiving area defined by the first and second sections when in the closed position;
a first gripping pad having a first connecting prong received in a first connecting opening of the first section; and
a second gripping pad having a second connecting prong received in a second connecting opening of the second section, wherein the first and second gripping pads are in the conductor receiving area.

16. The assembly of claim 14, wherein the first spring and the second spring are selected from a group consisting of a torsion spring, a compression spring, and an extension spring.

17. A flight diverter assembly, comprising:
a first section having a first outer surface, a first hinge pin, a first hinge knuckle, a first left conductor gripping pad at the first hinge pin, and a first right gripping pad at the first hinge knuckle;
a second section having a second outer surface, a second hinge pin, and a second hinge knuckle, a second left conductor gripping pad at the second hinge pin, and a second right gripping pad at the second hinge knuckle, the first hinge pin being movably secured to the second hinge knuckle and the second hinge pin being movably secured to the first hinge knuckle so that the first and second sections are movable about a hinge axis between an open position and a closed position,
a biasing member normally biasing the first and second sections to the closed position; and
a toggle action lever mechanism connected to the first and second sections, the toggle action lever mechanism having an over-center position that corresponds with the open position, wherein the toggle action lever mechanism releasably holds the first and second sections in the open position when in the over-center position,
wherein the toggle action lever mechanism is positioned between the first and second sections such that, during installation on a conductor, the conductor interacts with the toggle action lever mechanism to move the toggle action lever mechanism from the over-center position to allow the biasing member and the toggle action lever mechanism to move the first and second sections to the closed position,
wherein the first and second left gripping pads define a left conductor receiving area when in the closed position, and wherein the first and second right gripping pads define a right conductor receiving area when in the closed position, and
wherein the toggle action lever mechanism is positioned between the left and right conductor receiving areas.

* * * * *